United States Patent [19]
Beaudet et al.

[11] Patent Number: 5,355,740
[45] Date of Patent: Oct. 18, 1994

[54] VEHICLE AIR BAG TEST APPARATUS

[75] Inventors: Brian M. Beaudet, Lake Orion; Frederick M. Peters, Northville, both of Mich.

[73] Assignee: Chrysler Corporation, Highland Park, Mich.

[21] Appl. No.: 47,932

[22] Filed: Apr. 19, 1993

[51] Int. Cl.$^5$ .............................................. B60R 21/16
[52] U.S. Cl. ....................................... 73/865.6; 73/37; 280/743 R
[58] Field of Search .................. 73/37, 865.6; 280/743, 280/739

[56] References Cited

U.S. PATENT DOCUMENTS 4,951,697  8/1990  Fitts ...................................... 137/68.1

OTHER PUBLICATIONS

BS & B Catalog 77-1007 Section B, p. 7, Apr., 1989.
BS & B Catalog 77-1001 Section A, p. 11, Mar., 1989.

Primary Examiner—Hezron E. Williams
Attorney, Agent, or Firm—Edward P. Barthel

[57] ABSTRACT

A test fixture for simulating the inflation profile of a vehicle air bag. The test fixture includes a cavity block containing compressed nitrogen at a first predetermined pressure, and accumulator containing compressed nitrogen a second higher predetermined pressure, a diffuser containing an air bag at ambient pressure, a first rupture disk intermediate the accumulator and the cavity block adapted to rupture at a third predetermined pressure intermediate the first and second predetermined pressures, and a second rupture disk intermediate the diffuser and the cavity block adapted to rupture at a fourth predetermined pressure intermediate the first and second predetermined pressures. A valve is connected to the cavity block to selectively open the latter to release the mixture from the cavity block, to thereby increase the pressure differential across the first rupture disk to rupture same and then subject the second rupture disk to the released mixture to rupture same and, thence, subject the diffuser to the released pressure to inflate the air bag.

12 Claims, 3 Drawing Sheets 5,355,740

VEHICLE AIR BAG TEST APPARATUS

TECHNICAL FIELD

This invention relates generally to vehicle air bag test apparati and, more particularly, to such equipment wherein an air bag system inflator need not be used, but wherein the actual inflation profile can be matched, especially for a passenger side system within the instrument panel.

BACKGROUND ART

Heretofore, known air bag testing apparati have been deficient in coordinating the required volume and flow characteristics of gas to an inflator to develop the forces that are generated on the air bag and the air bag door during a live deployment.

A quick opening valve, manufactured by BS & B Safety Systems, Tulsa, Okla., is known. The valve includes in inlet end, an outlet end, an intermediate port, and two rupture disks in series on opposite sides of the port. When pressure between the disks is reduced, the first disk will rupture, followed immediately by the second disk.

DISCLOSURE OF THE INVENTION

It is a general object of the invention to provide an improved air bag test apparatus.

It is another object of the invention to provide an air bag test apparatus which simulates the inflation profile of the inflator in a live deployment.

It is a further object of the invention to provide an air bag test apparatus including dual burst disks in series in a manner which controls the rupture timing while providing a means of tuning the system to the specific inflation profile desired.

It is still another object of the invention to provide a test fixture for simulating the inflation profile of a vehicle air bag, the test fixture including cavity means containing a gas at a first predetermined pressure, an accumulator including the gas at a second higher predetermined pressure, a diffuser at ambient pressure, first rupturable means intermediate the accumulator and the cavity means adapted to rupture at a third predetermined pressure intermediate the first and second predetermined pressures, second rupturable means intermediate the diffuser and the cavity means adapted to rupture at a fourth predetermined pressure intermediate the first and second predetermined pressures, and valve means operatively connected to the cavity means to selectively open same to release the gas at the first predetermined pressure, to thereby increase the pressure differential across the first rupturable means to rupture same and then subject the second rupturable means to the released gas to rupture same and, thence, subject the diffuser to the released gas.

These and other objects and advantages will become more apparent when reference is made to the following drawings and the accompanying description.

BEST MODE OF CARRYING OUT THE INVENTION

Figure 1:
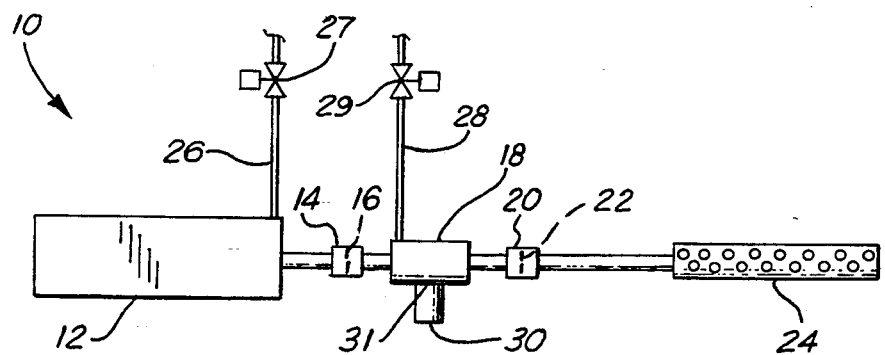
FIG. 1 is a schematic view of the inventive dual disk test fixture.

Referring now to the drawings in greater detail, FIG. 1 illustrates a test fixture 10 including connected in series an accumulator 12, a first union assembly 14 encompassing a first rupture disk, represented as 16, a cavity block 18, a second union assembly 20 encompassing a second rupture disk, represented as 22, and a diffuser 24. Such union assemblies are available from BS & B Safety Systems, 7455 East 46th St., Tulsa, Okla. 74147.

A first nitrogen fill line 26, including a solenoid valve 27, is in communication between the accumulator 12 and a nitrogen source to be explained. A second nitrogen fill line 28, including a solenoid valve 29, is in communication between the cavity block 18 and the nitrogen source. A solenoid valve 30 is threadedly secured in a side inlet 31 (FIG. 3) provided in the cavity block 18.

Figure 2:
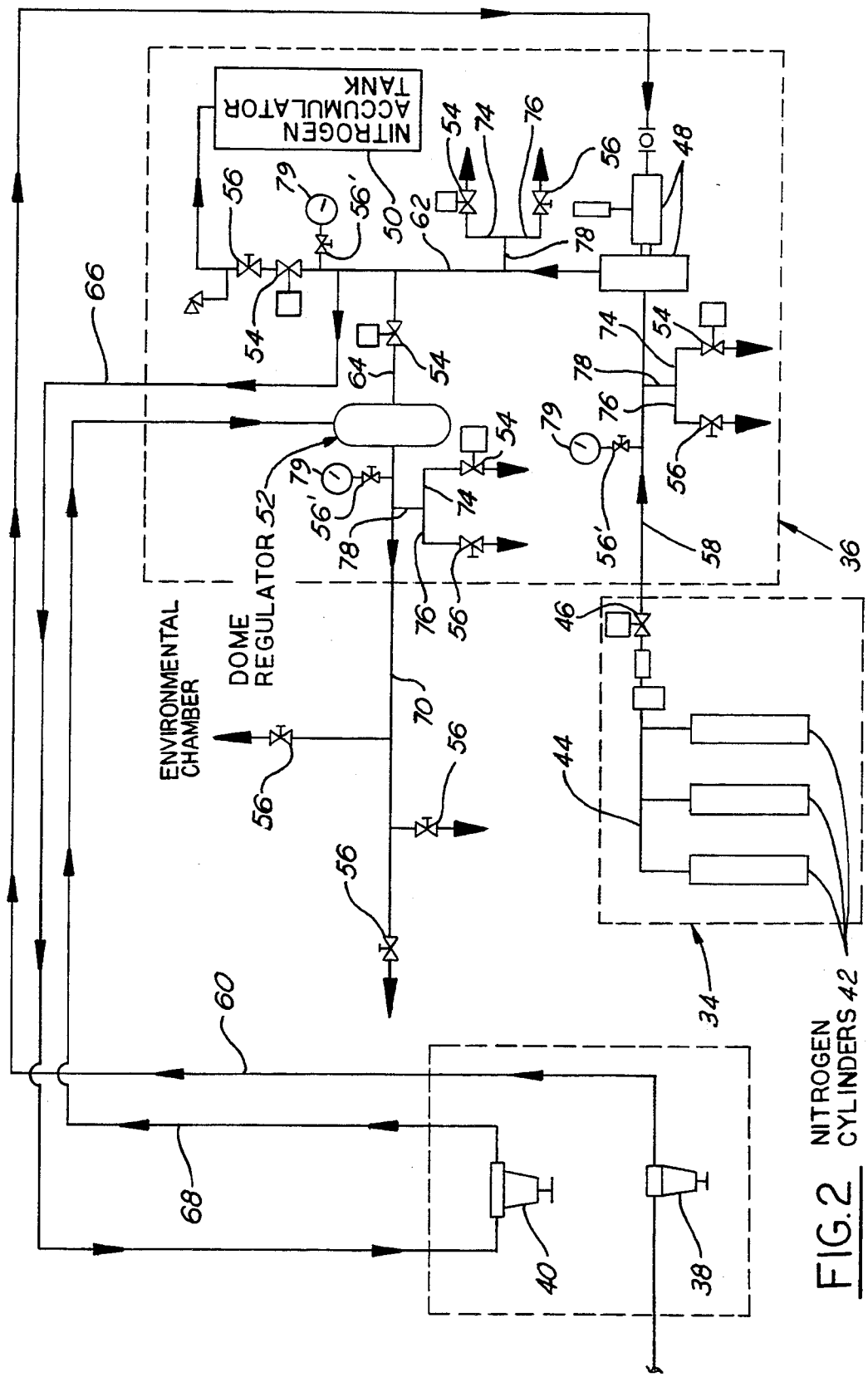
FIG. 2 is a layout view of an air bag test cell nitrogen flow diagram operatively connected to the test fixture.

The nitrogen flow diagram of FIG. 2 is somewhat conventional and may comprise a control panel 32, a nitrogen cabinet 34, and an accumulator cabinet 36. The control panel 32 includes a compressed air regulator 38 and a nitrogen regulator 40. The nitrogen cabinet 34 includes three nitrogen cylinders 42, a cooperating cylinder regulator header 44, and a solenoid valve 46. The accumulator cabinet 36 includes a nitrogen booster pump 48, a nitrogen accumulator tank 50, a dome regulator 52, and various solenoid valves 54 and hand shut-off valves 56. The accumulator tank 50 has a pop-off valve rated at 5000 psi to prevent over pressuring. Each branch line 78 is used only as a means to vent the line pressure after a test is completed. The valves 56 are used only in an emergency as a line vent in case of a power failure.

Figure 5:
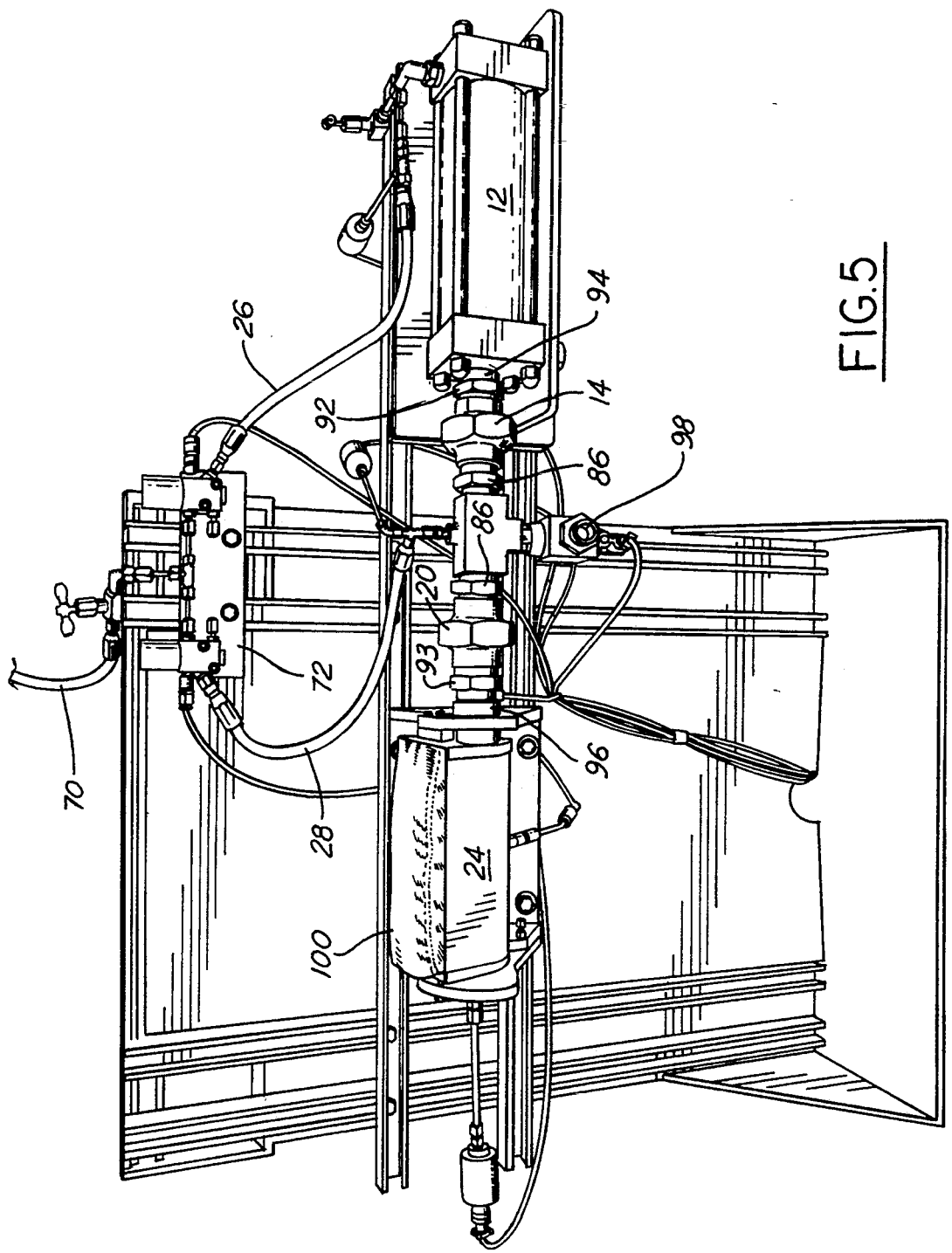
FIG. 5 is a side elevational view of the actual hardware embodied in the FIG. 1 schematic view.

Nitrogen is supplied from the cylinders 42 and their cylinder regulator header 44 through the solenoid valve 46 via a line 58 to the nitrogen booster pump 48. Compressed air is supplied from the regulator 38 via a line 60 to the nitrogen booster pump 48. The compressed air regulator 38 is used to control the speed of the nitrogen booster pump 48. The compressed air is not mixed with the high pressure nitrogen gas. The compressed nitrogen flows through a line 62 to the nitrogen accumulator tank 50, and through a first branch line 64 to the dome regulator 52 and a second branch line 66 to the nitrogen regulator 40, and, from the latter through a line 68 to the dome regulator 52. The flow from the dome regulator 52 is through a line 70 to a flow divider 72 (FIG. 5). From the latter, the lines 26 and 28 communicate with the accumulator 12 and the cavity block 18, as indicated above.

A pair of valves consisting of one solenoid valve 54 and one hand shut-off valve 56 is effective via respective branch lines 74 and 76 tying into a line 78 to connect with each of the lines 58, 62 and 70. Single hand shut-off valves 56 are also operatively connected to each of the lines 62 and 70. A single solenoid valve 54 is mounted in the branch line 64, and in the line 62. Three pressure transducers 79 are operatively connected to the respective lines 58, 62, and 70, to monitor the source pressure, accumulator pressure, and operating pressure, respectively. A hand valve 56' is associated with each transducer 79 to shut off the line pressure in order to service the transducer.

Figure 3:
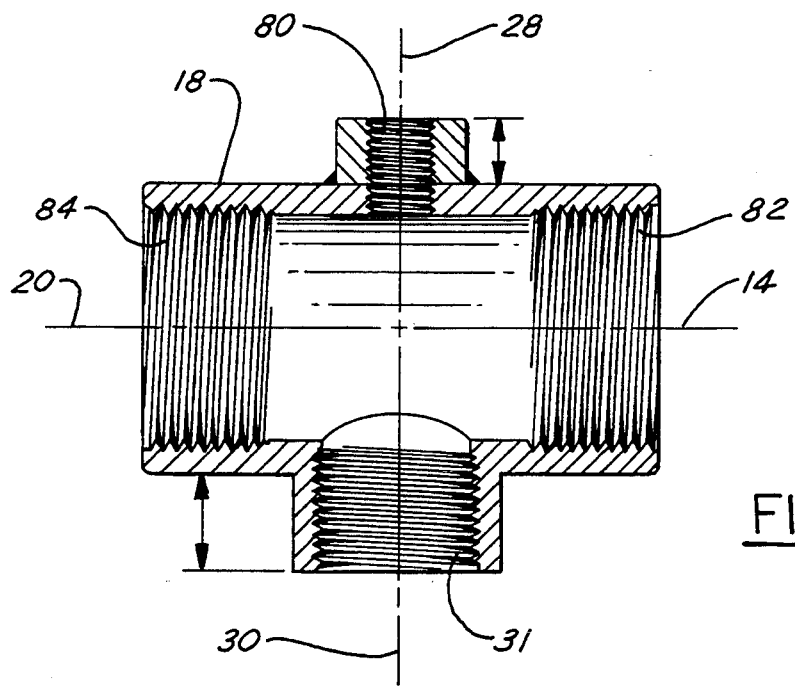
FIG. 3 is a cross-sectional view of one component of the FIG. 1 structure.

Referring now to FIG. 3, the nitrogen fill line 28 is threadedly secured to a side inlet 80 into the cavity block 18. The union assemblies 14 and 20 are connected to respective inlets 82 and 84 at opposite ends of the cavity block 18, such as by short nipples 86, as shown in FIG. 5.

Figure 4:
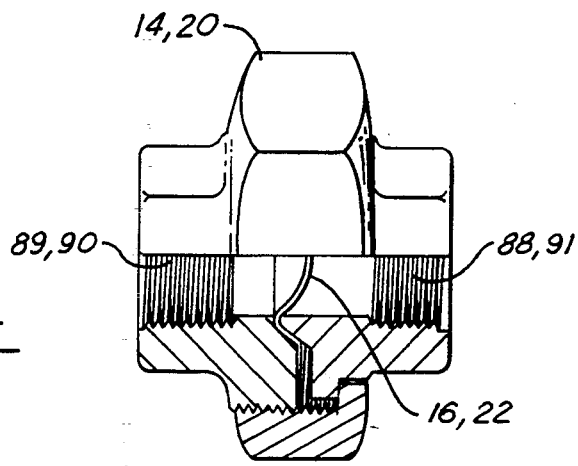
FIG. 4 is a cross-sectional view of a second component of the FIG. 1 structure.

Referring now to FIG. 4, the union assemblies 14 and confine the outer peripheries of the respective rupture disks and 22 intermediate their connecting edges. A threaded outlet of the union assembly 14, and a threaded inlet 89 of the union assembly 20, are connected to the respective short nipples 86, while the opposite threaded inlet 90 of the union assembly 14, and the threaded outlet 91 of the union assembly 20, are connected via short nipples 92 and 93 (FIG. 5) to a threaded outlet 94 and threaded inlet 96 in the respective accumulator 12 and diffuser 24.

Each rupture disk 16 and 22 consists of a thin concave sheet of metal, which may vary in thickness, depending upon the desired burst pressure rating, with the convex side of each disk facing in the direction of flow.

The solenoid valve 30 (FIG. 5) includes an outlet 98. The diffuser 24 includes a bag 100 to be inflated during each test run.

In operation, the above described cold gas system is actuated by opening the solenoid valve 30 to thereby create a sudden pressure differential between the accumulator 12 and the cavity block 18. This pressure differential causes the first rupture disk 16 to rupture due to the high pressure in the accumulator 12, which, in turn, causes the second rupture disk 22 to rupture.

While the test pressures will vary depending upon the desired inflation profile, as an example, to conduct a particular test, the accumulator tank 50 is first charged-up to 3500 psi by closing off the branch line 64. Thereafter, the booster pump 48 is not used. For the selected application, the pressure in the accumulator 12 is at 2100 psi, the pressure in the cavity block 18 at 700 psi, and both rupture disks 16 and 22 rated at 1500 psi. As such, the pressure differential across the disk 16 is 1400 psi, and across the disk 22 is 700 psi. Hence, when the solenoid valve 30 is opened, the 700 psi of nitrogen escapes very rapidly, causing the pressure differential across the disk 16 to increase. Once this differential increases by 100 psi, the first disk 16 ruptures. The second disk 22 is then effectively subjected to the 2100 psi causing it to rupture to thereupon subject the diffuser 24 and bag 100 to the 2100 psi.

The system can be tuned to a specific inflation profile by changing the pressures in the accumulator 12 and the cavity block 18. The volume of the accumulator 12 can also be varied to further tune the system. The cavity block 18 is made out of high strength steel in order to withstand up to 6000 psi.

The initial pressures in the accumulator 12 and block cavity 18 are set as follows:

The solenoid valve 30 is closed prior to filling the accumulator 12 and the block cavity 18. For the above described example, the dome regulator 52 is set for 700 psi from the control panel 32 and the nitrogen cabinet 34. The solenoid valves 27 and 29 (FIG. 1) in the respective lines 26 and 28 are opened simultaneously. When the pressure has stabilized, the valves 27 and 29 are closed. The dome regulator 52 is then set for 2100 psi. The valve 27 is next opened to increase the accumulator 12 pressure to 2100 psi. When the pressure has stabilized, the valve 27 is closed, and test fixture 10 is ready to be fired.

INDUSTRIAL APPLICABILITY

It should be apparent that the invention provides an air bag test fixture which can be primed so as to be fired to duplicate the precise time of a live deployment of an air bag normally mounted in the passenger side of the instrument panel.

It should be further apparent that the invention can be tuned to match various inflation profiles.

While but one embodiment of the invention is illustrated and described, other modifications thereof are possible within the scope of the following claims.

What is claimed is:

1. A test fixture for simulating the inflation profile of a vehicle air bag, the test fixture comprising cavity block containing a gas at a first predetermined pressure, an accumulator containing said gas at a second higher predetermined pressure, a diffuser containing an air bag at ambient pressure, first rupturable means intermediate said accumulator and said cavity block adapted to rupture at a third predetermined pressure intermediate said first and second predetermined pressures, second rupturable means intermediate said diffuser and said cavity block adapted to rupture at a fourth predetermined pressure intermediate said first and second predetermined pressures, and valve means operatively connected to said cavity block to selectively open to release said gas from said cavity block at said first predetermined pressure, to thereby increase the pressure differential across said first rupturable means to rupture same and then subject the second rupturable means to said released gas to rupture same and, thence, subject said diffuser to said released gas to inflate said air bag.

2. The test fixture in claim 1, wherein said cavity block is a cylindrical sleeve having two side openings formed therein for selective inlet and outlet of said gas at said first predetermined pressure.

3. The test fixture described in claim 1, wherein said first and second rupturable means are rupture disks rated to rupture at predetermined pressures.

4. The test fixture described in claim 3, wherein said rupture disks are thin concave shaped sheets of metal having their convex sides facing in the direction of flow.

5. The test fixture described in claim 1, wherein said valve means is a solenoid valve.

6. The text fixture described in claim 1, wherein said first, second, third, and fourth predetermined pressures are on the respective orders of 700 psi, 2100 psi, 1500 psi, and 1500 psi, respectively.

7. The test fixture described in claim 1, wherein said vehicle air bag whose inflation profile is being simulated is an air bag mounted in the passenger side instrument panel.

8. The test fixture described in claim 1, and supply means for alternately supplying said first and second predetermined pressure.

9. The test fixture described in claim 8, wherein said gas is nitrogen and said supply means includes a source of nitrogen, a source of compressed air, and a dome regulator adapted to receive said nitrogen and to be set at said first predetermined pressure to regulate said nitrogen to said cavity means via first valve means, and then set at said second predetermined pressure to regulate said nitrogen to said accumulator via second valve means.

10. A method of priming a test fixture for simulating the inflation profile of a vehicle air bag, said method comprising the steps of:
  a. providing gas at a first predetermined pressure to a cavity;
  b. providing gas at a second higher predetermined pressure to an accumulator;
  c. mounting intermediate the accumulator and the cavity a first member which is rupturable at a third predetermined intermediate pressure;
  d. mounting intermediate the cavity and a diffuser containing an air bag a second member which is rupturable at a fourth predetermined intermediate pressure; and
  e. providing a valve for releasing the gas from the cavity to thereby rupture in turn the first member and the second member and subject the diffuser to the second predetermined pressure to thereby inflate said air bag.

11. The method described in claim 10, wherein said first and second members are concave shaped rupture disks having their convex sides facing in the direction of gas flow.

12. The method described in claim 10, wherein said gas is compressed nitrogen, and the steps of supplying same from separate sources to a dome regulator, setting the dome regulator at said first predetermined pressure, opening a first valve in a line between the dome regulator and said cavity means to fill the latter at said first predetermined pressure, closing said first valve, setting the dome regulator at said second predetermined pressure, opening a second valve in a line between the dome regulator and said accumulator to fill the latter at said second predetermined pressure, and closing said second valve.

* * * * *